(No Model.)
W. J. GOHN.
CULTIVATOR.
No. 419,328. Patented Jan. 14, 1890.
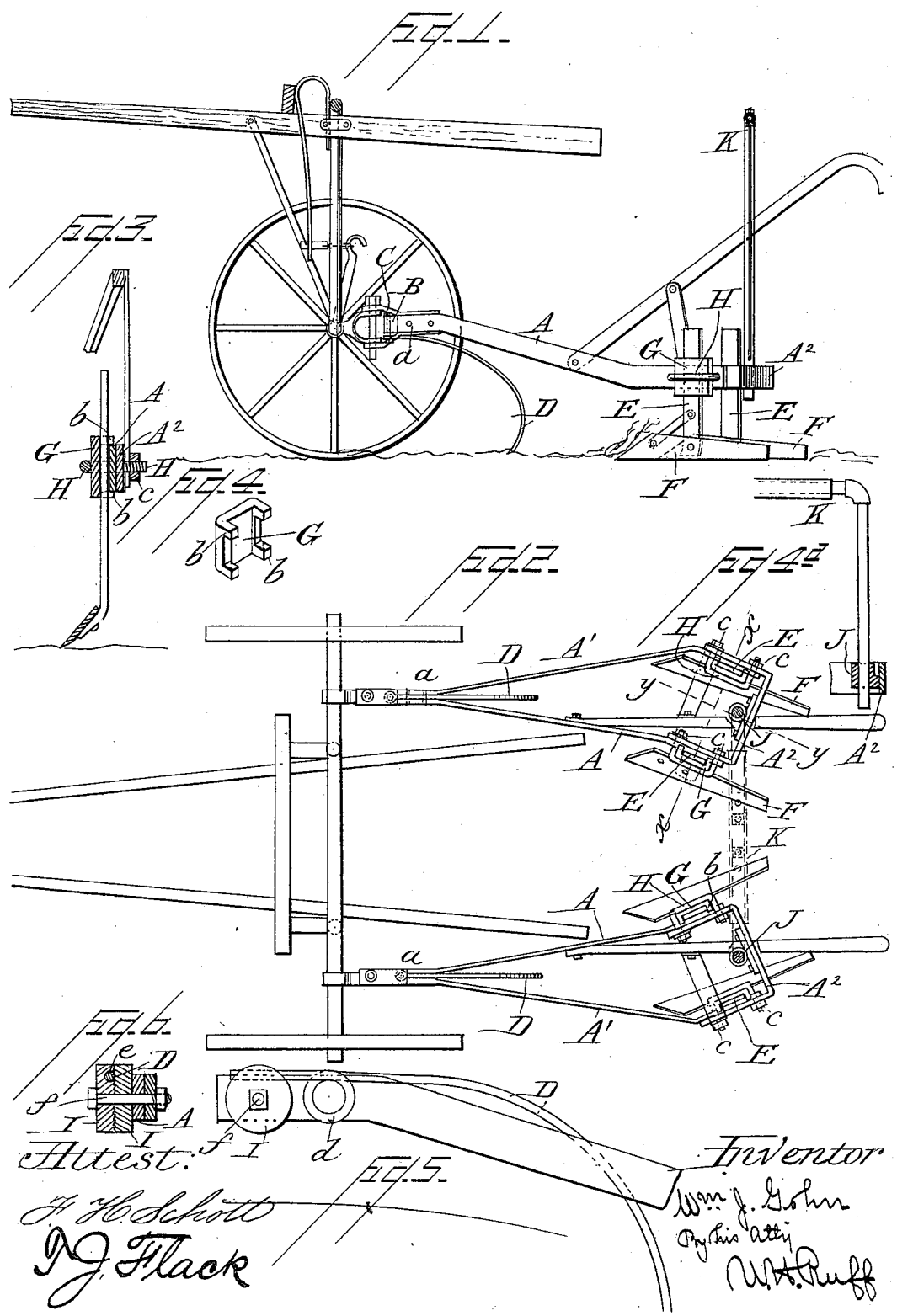
Attest:
J. H. Schott
D. J. Flack
Inventor
Wm. J. Gohn
By his atty
W. H. Ruff

UNITED STATES PATENT OFFICE.

WILLIAM J. GOHN, OF DANVILLE, ILLINOIS.

CULTIVATOR.

SPECIFICATION forming part of Letters Patent No. 419,328, dated January 14, 1890.

Application filed September 16, 1889. Serial No. 324,057. (No model.)

*To all whom it may concern:*

Be it known that I, WILLIAM J. GOHN, of Danville, in the county of Vermilion and State of Illinois, have invented certain new and useful Improvements in Corn-Cultivators; and I do hereby declare the following to be a full, clear, and exact description of the invention, such as will enable others skilled in the art to which it appertains to make and use the same.

My invention relates to an improvement in corn-cultivators, the object of the same being to provide a cultivator of the above character having independently-adjustable plows or blades.

A further object is to provide a plow of the above character which will be simple and economical in construction and durable and efficient in use; and with these ends in view my invention consists in certain features of construction and combination of parts, as will be hereinafter fully described, and pointed out in the claims.

In the accompanying drawings, Figure 1 is a vertical central section of my improved cultivator. Fig. 2 is a plan view of the same. Fig. 3 is a section on X X of Fig. 2. Fig. 4 is a perspective of the clamp. Fig. 4$^a$ is a section on $y\ y$ of Fig. 2. Figs. 5 and 6 are details of the spring-drag.

The letters A and A' indicate the beams, the forward ends $a$ of which are adapted to be secured to the axle of the machine. The beams converge and are suitably secured together, as shown. To the forward ends $a$ of the beams are secured the boxes B, through which pass the bolts C, adapted to carry the spring drags or hooks D D, which are placed in front of the plows and serve to clear away the trash from the path of said plows.

The beams A and A' curve or incline downward from the axle, thereby lessening the leverage on the shanks E E of the plows. To the rear end of each pair of beams A A' is bolted a double angle-iron A$^2$, which forms a square loop with the ends of the beams. To the shanks E, at their lower ends, are secured the plows, blades, or shovels F F.

There are two pairs of beams A A', and each pair carries two shanks. The shanks extend vertically upward and bear one against the side of beam A and the other against beam A'.

G represents a clamp, which bears against the shank and has four projections or lips $b$, which rest on the top and bottom of the beam.

H is the clamp-bolt, which is bent around the outside of clamp, its two ends passing through the beam and angle-iron A$^2$. By screwing up the nuts $c$ on the threaded ends of the bolt the clamp and shank, as well as the angle-iron A$^2$, will be rigidly clamped to the beam. By loosening the nuts the shank of each plow or blade can be adjusted independently to work at any desired depth in the ground.

The spring-drags D are made each with a spring-loop $d$, as shown in Fig. 5, the object of the loop being to add elasticity to the drags and render the same less liable to breakage when in contact with the weeds, and has its end secured between two collars I I, which are secured by a bolt $f$ to the beams, as shown in section in Fig. 6. A notch or recess $e$ in one of the collars I receives the end of the spring-drag, which is held fast between the notched or roughened faces of the collars. Each angle-iron A$^2$ has bolted to it on its inner side a guide loop or ring J. Through these two guides pass the downwardly-projecting arms of the adjustable arch K. By means of this arch the pairs of plows are laterally adjustable. This arch forms the subject-matter of Patent No. 403,426 and needs no further description.

Having thus described my invention, what I claim as new, and desire to secure by Letters Patent, is—

1. A cultivator having an adjustable arch K, guides J, angle-irons A$^2$, beams A A', plow-shank E, clamp G, having projections $b$, clamp-bolt H, and nuts $c$, for adjustably securing the shank to the beam, and a spring drag or hook D, having loop $d$, and collars I I, having recess $e$, for the reception of the end of the drag, substantially as shown and described.

2. The combination, in a cultivator, of a spring drag or hook D, having loop $d$, collars I I, roughened on their meeting faces and one of them provided with a recess $e$, for the reception of the end of the drag, bolts $f$, and beams A A', substantially as described.

In testimony whereof I have signed this specification in the presence of two subscribing witnesses.

WM. J. GOHN.

Witnesses:
 GEO. W. WHYTE,
 GEO. G. MABIN.